United States Patent
Sawal et al.

(10) Patent No.: US 10,725,800 B2
(45) Date of Patent: Jul. 28, 2020

(54) USER-SPECIFIC CUSTOMIZATION FOR COMMAND INTERFACE

(71) Applicant: DELL PRODUCTS L.P., Round Rock, TX (US)

(72) Inventors: Vinay Sawal, Fremont, CA (US); Sachinrao Chittaranjan Panemangalore, San Jose, CA (US); Vivek Dharmadhikari, San Jsoe, CA (US); Kuntal Atulbhai Patel, San Jose, CA (US); Gavin Cato, Los Gatos, CA (US); Krishnamurthy Subramanian, Saratoga, CA (US); Joseph White, San Jose, CA (US)

(73) Assignee: DELL PRODUCTS L.P., Round Rock, TX (US)

(*) Notice: Subject to any disclaimer, the term of this patent is extended or adjusted under 35 U.S.C. 154(b) by 35 days.

(21) Appl. No.: 15/268,488

(22) Filed: Sep. 16, 2016

(65) Prior Publication Data
US 2017/0109356 A1    Apr. 20, 2017

Related U.S. Application Data

(63) Continuation-in-part of application No. 15/045,116, filed on Feb. 16, 2016, which is a continuation-in-part of application No. 14/885,015, filed on Oct. 16, 2015.

(51) Int. Cl.
*G06F 9/451* (2018.01)
*G06F 16/332* (2019.01)

(52) U.S. Cl.
CPC .......... *G06F 9/453* (2018.02); *G06F 16/3322* (2019.01)

(58) Field of Classification Search
CPC .. G06F 9/453; G06F 17/3064; G06F 17/3097; G06F 16/3322
USPC ................................................. 707/722–735
See application file for complete search history.

(56) References Cited

U.S. PATENT DOCUMENTS

| 6,065,003 A | 5/2000 | Sedluk |
| 6,070,133 A | 5/2000 | Brewster |
| 6,275,976 B1 | 8/2001 | Scandura |
| 9,043,759 B1 | 5/2015 | Lininger |

(Continued)

OTHER PUBLICATIONS

"Gensim: Topic modelling for humans", [online], [retrieved Jul. 27, 2016]. Retrieved from Internet < URL: https://radimrehurek.com/gensim/index.html> (2pgs).

(Continued)

*Primary Examiner* — Hares Jami
(74) *Attorney, Agent, or Firm* — North Weber & Baugh LLP

(57) ABSTRACT

Aspects of the present disclosure relate to systems and methods that help a user manage a functional product. Every functional product, be it a service, device, or combination thereof, has one or more documents associated with it. These documents may include such documentation as: (1) Release Notes; (2) Configuration Guides; (3) command line interfaces (CLIs)/application program interfaces (APIs); (4) Data Sheets; (5) Installation Guides; (6) User Manuals; (7) Errata notices; and (8) other documentation. In embodiments, command extracted from the documents along with features available in the functional product and user history (if any) may be used to help suggest one or more commands for a user managing or using the functional product.

20 Claims, 11 Drawing Sheets

(56) References Cited

U.S. PATENT DOCUMENTS

| | | | |
|---|---|---|---|
| 9,722,879 B1* | 8/2017 | Muthu | G06F 3/06 |
| 9,792,275 B2 | 10/2017 | Panemangalore | |
| 9,805,717 B2 | 10/2017 | Panemangalore | |
| 2004/0117380 A1* | 6/2004 | Perrow | G06F 3/0237 |
| 2004/0205560 A1 | 10/2004 | Polk | |
| 2006/0195747 A1 | 8/2006 | Pramanick | |
| 2007/0061348 A1 | 3/2007 | Holland | |
| 2008/0127043 A1 | 5/2008 | Zhou | |
| 2008/0140537 A1 | 6/2008 | Powell | |
| 2009/0094231 A1 | 4/2009 | Marvit | |
| 2009/0288072 A1 | 11/2009 | Kania | |
| 2009/0319388 A1 | 12/2009 | Yuang et al. | |
| 2010/0010989 A1* | 1/2010 | Li | G06F 16/334 |
| | | | 707/E17.017 |
| 2010/0082333 A1 | 4/2010 | Al-Shammari | |
| 2011/0022560 A1 | 1/2011 | Breiter | |
| 2011/0145316 A1 | 6/2011 | Ait-Ameur | |
| 2011/0179037 A1 | 7/2011 | Mizuguchi | |
| 2012/0016909 A1 | 1/2012 | Narain | |
| 2012/0089394 A1 | 4/2012 | Teodosiu | |
| 2013/0055029 A1 | 2/2013 | Lawrance | |
| 2013/0238629 A1 | 9/2013 | Kosuri | |
| 2013/0268260 A1 | 10/2013 | Lundberg | |
| 2013/0268916 A1 | 10/2013 | Misra | |
| 2013/0268917 A1* | 10/2013 | Chandrasekharan | G06F 8/30 |
| | | | 717/126 |
| 2014/0106734 A1 | 4/2014 | Lee | |
| 2014/0136187 A1 | 5/2014 | Wolverton | |
| 2014/0214904 A1 | 7/2014 | Ims | |
| 2014/0223417 A1 | 8/2014 | Schnitzhofer | |
| 2014/0282178 A1* | 9/2014 | Borzello | G06F 9/453 |
| | | | 715/771 |
| 2015/0019991 A1 | 1/2015 | Krist j nsson | |
| 2015/0052147 A1 | 2/2015 | Halabi | |
| 2015/0254337 A1 | 9/2015 | Iikura | |
| 2015/0348554 A1 | 12/2015 | Orr | |
| 2016/0026631 A1 | 1/2016 | Salam | |
| 2016/0042299 A1 | 2/2016 | Liang et al. | |
| 2016/0140123 A1* | 5/2016 | Chang | G06F 17/3043 |
| | | | 707/760 |
| 2016/0225371 A1 | 8/2016 | Agrawal | |
| 2017/0109356 A1 | 4/2017 | Sawal | |
| 2017/0109697 A1 | 4/2017 | Panemangalore | |
| 2017/0109698 A1 | 4/2017 | Sachinrao Chittaranjan | |
| 2017/0322861 A1 | 11/2017 | Chan | |
| 2018/0052663 A1 | 2/2018 | Castelli | |
| 2018/0267887 A1 | 9/2018 | Dsouza | |

OTHER PUBLICATIONS

Google Code Archive—long term storage for Google Code Project Hosting, word2vec, "Tools for computing continuous distributed representations of words", [online] [retrieved Jul. 26, 2016]. Retrieved from Internet < URL: https://code.google.com/p/word2vec> (7pgs).

Sentiment Analysis—text-processing.com API 1.0 documentation, [online], [retrieved Jul. 27, 2016]. Retrieved from Internet < URL: http://text-processing.com/docs/sentiment.html> (2pgs).

The Stanford Natural Language Processing Group, "Software (/software/) >Stanford Relation Extractor", [online], [retrieved Jul. 27, 2016]. Retrieved from Internet < URL: http://nlp.stanford.edu/software/relationExtractor.html> (3pgs).

Sentiment Analysis with Python NLTK Text Classification, [online], [retrieved Jul. 27, 2016]. Retrieved from Internet <URL:http://text-processing.com/demo/sentiment/> (3pgs).

Non-Final Office Action dated Dec. 26, 2017, in related U.S. Appl. No. 15/045,116 (26 pgs).

Response filed Feb. 28, 2018, in related U.S. Appl. No. 15/045,116 (13 pgs).

Non-Final Office Action dated Aug. 10, 2017, in related U.S. Appl. No. 15/045,116 (30 pgs).

Response filed Nov. 10, 2017, in related U.S. Appl. No. 15/045,116 (19 pgs).

U.S. Appl. No. 14/885,015, filed Oct. 16, 2015, Panemangalore, Document Verification.

U.S. Appl. No. 15/098,107, filed Apr. 13, 2016, Sawal, Design Validation Using Natural Language Processing.

U.S. Appl. No. 15/045,116, filed Feb. 16, 2016, Panemangalore, Test Vector Generation from Documentation.

Non-Final Office Action dated Jun. 27, 2018, in related U.S. Appl. No. 15/045,116 (29 pgs).

Arista at-a-glance, "CloudVisionTM: Single Point of Administration and Management," [online], [retrived Mar. 1, 2015]. Retrieved from Internet <URL: https://www.arista.com> (3 pgs).

Arista at-a-glance, "EOS Cloudvision," [online]. Retrieved from Internet <URL: https://www.arista.com>, 2015 (2 pgs).

Patseer, "Voice Recognition—Controlling mobile devices using voice commands," [online] , [retrieved Mar. 1, 2015]. Retrieved from Internet <URL: http://patseer.com>, 2015 (27 pgs).

Response filed Sep. 26, 2018, in related U.S. Appl. No. 15/045,116 (14 pgs).

Non-Final Office Action dated Apr. 30, 2019, in related U.S. Appl. No. 15/098,107 (22 pgs).

Nanduri et al.,"Requirements validation via automated natural language parsing," Journal of Management Information Systems 12, No. 3 (1995): 9-19. (7 pgs).

Non-Final Office Action dated Jun. 17, 2019, in related U.S. Appl. No. 15/045,116 (26 pgs).

Fontoura et al.,"Inverted Index Support for Numeric Search," Sep. 12, 2005. [Online], [Retrieved Jun. 20, 2019]. Retrieved from Interner <URL:http://fontoura.org/papers/paramsearch.pdf> (22 pgs).

Final Office Action dated Jan. 25, 2019, in related U.S. Appl. No. 15/045,116 (26 pgs).

Response filed Apr. 25, 2019, in related U.S. Appl. No. 14/885,015 (16pgs).

Response filed Apr. 25, 2019, in related U.S. Appl. No. 15/045,116 (15pgs).

Non-Final Office Action dated Jan. 25, 2019, in related U.S. Appl. No. 14/885,015 (33 pgs).

Response filed Jul. 30, 2019, in related U.S. Appl. No. 15/098,107 (17 pgs).

Final Office Action dated Aug. 23, 2019, in related U.S. Appl. No. 15/098,107 (22 pgs).

Final Office Action dated Aug. 7, 2019, in related U.S. Appl. No. 14/885,015 (38pgs).

Response filed Sep. 17, 2019, in related U.S. Appl. No. 15/045,116 (12 pgs).

Response filed Oct. 21, 2019, in related U.S. Appl. No. 15/098,107 (14 pgs).

Notice of Allowance dated Nov. 1, 2019, in related U.S. Appl. No. 15/098,107 (8 pgs).

Non-Final Office Action dated Nov. 29, 2019, in related U.S. Appl. No. 14/885,015 (41pgs).

Final Office Action dated Dec. 10, 2019, in related U.S. Appl. No. 15/045,116 (27 pgs).

Response filed Nov. 7, 2019, in related U.S. Appl. No. 14/885,015 (16pgs).

Notice of Allowance dated Feb. 5, 2020, in related U.S. Appl. No. 15/098,107 (8 pgs).

Notice of Allowance and Fee Due dated Apr. 17, 2020, in related U.S. Appl. No. 15/045,116 (18 pgs).

Final Office Action dated Jun. 11, 2020, in related U.S. Appl. No. 14/885,015 (49 pgs).

* cited by examiner

USER-SPECIFIC CUSTOMIZATION FOR COMMAND INTERFACE

CROSS-REFERENCE TO RELATED APPLICATION

This application is a continuation-in-part of and claims the benefit of and priority, under 35 U.S.C. § 120, to U.S. patent application Ser. No. 15/045,116, filed on Feb. 16, 2016, entitled "TEST VECTOR GENERATION FROM DOCUMENTATION," listing Sachinrao Panemangalore, Vinay Sawal, Vivek Dharmadhikari, Kuntal Patel, Gavin R. Cato, and Joseph L. White as inventors, which is a continuation-in-part of and claims the benefit of and priority, under 35 U.S.C. § 120, to U.S. patent application Ser. No. 14/885,015, filed on Oct. 16, 2015, entitled "DOCUMENT VERIFICATION," listing Sachinrao Panemangalore, Vinay Sawal, Vivek Dharmadhikari, Kuntal Patel, and Gavin R. Cato as inventors. Each of the aforementioned patent documents is incorporated by reference herein in its entirety.

BACKGROUND

A. Technical Field

The present disclosure relates to technical documentation and functional products. More particularly, the present disclosure relates to systems and methods that aids network management by using information extracted from technical documentation for functional products, such as network devices and/or services, and by learning user's interactions with the functional products.

B. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use, such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Ever increasing demands for data and communications have resulted in vast arrays of ever expanding networks that comprise information handling systems. As these networks evolve and expand, new equipment, new features, and new functionality are added at different times and for different reasons. One result of such expansions is a heterogeneous mix of different networking equipment from a plurality of vendors. This patchwork of increasingly complex equipment makes it increasingly more complex for network administrators to configure, manage, and maintain.

Regardless of the complexity of the task or amount of documentation, such networks are often critical; therefore, it is important that they operate properly. Designing and operating a network properly can help avoid or fix issues, but, as noted above, a typical data center often comprises multi-vendor networking equipment. Therefore, beyond the first-time configuration issues, every vendor has its own set of command line interfaces (CLIs) or application programming interfaces (APIs) that the administrator must know and use in order to configure the devices. Having to be conversant in several different vendor-specific CLIs/APIs requires a highly knowledgeable network administration staff. Even if a system does not contain components from multiple vendors, such systems are often very complex to manage.

Despite highly knowledgeable and highly capable network administration staff, it is always beneficial to make configuration and managing such systems easier and more intuitive whenever possible. Making the systems easier and more intuitive improves the likelihood that the network will be configured correctly, that less errors will be made, and that problems will be resolved more quickly.

Accordingly, what is needed are systems and methods that help improve the interfacing with information handling systems for configuration, administration, and/or operation of functional products, such as, networking devices, services, or both.

BRIEF DESCRIPTION OF THE DRAWINGS

References will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

DETAILED DESCRIPTION OF THE PREFERRED EMBODIMENTS

Figure 1:
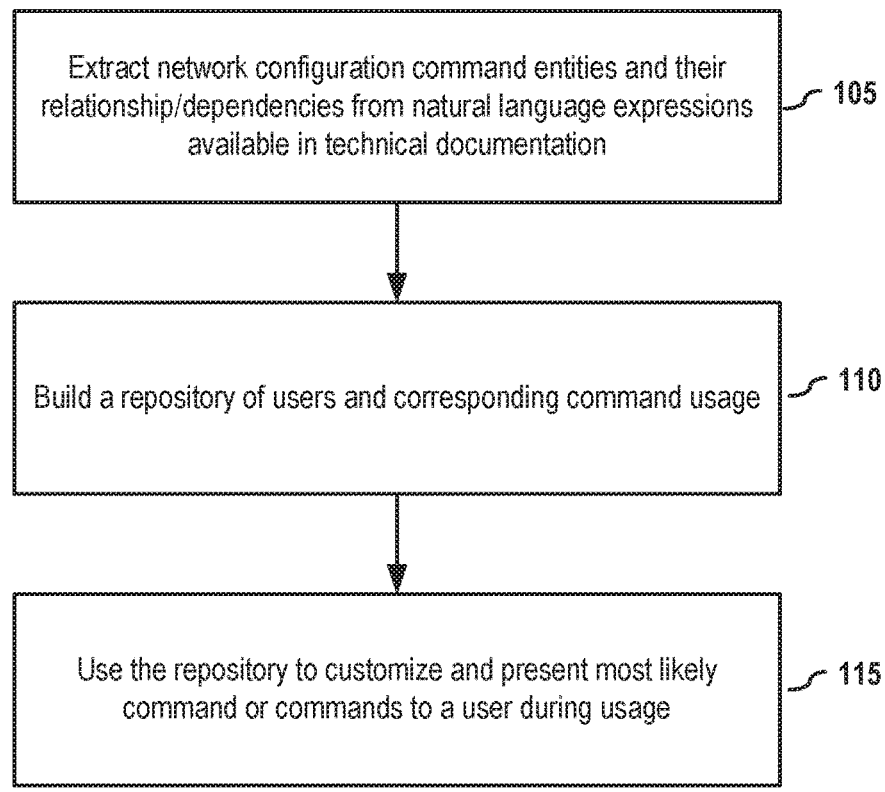
FIG. 1 depicts an example method for providing user-specific customization according to embodiments of the present disclosure.

In the following description, for purposes of explanation, specific details are set forth in order to provide an understanding of the invention. It will be apparent, however, to one skilled in the art that the invention can be practiced without these details. Furthermore, one skilled in the art will recognize that embodiments of the present invention, described below, may be implemented in a variety of ways, such as a process, an apparatus, a system/device, or a method on a tangible computer-readable medium.

Components, or modules, shown in diagrams are illustrative of exemplary embodiments of the invention and are meant to avoid obscuring the invention. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. Also, appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated. Furthermore, the use of memory, database, information base, data store, tables, hardware, and the like may be used herein to refer to system component or components into which information may be entered or otherwise recorded.

The terms "data," "information," along with similar terms may be replaced by other terminologies referring to a group of bits, and may be used interchangeably. The terms "include," "including," "comprise," and "comprising" shall be understood to be open terms and any lists the follow are examples and not meant to be limited to the listed items. Any headings used herein are for organizational purposes only and shall not be used to limit the scope of the description or the claims.

Furthermore, it shall be noted that: (1) certain steps may optionally be performed; (2) steps may not be limited to the specific order set forth herein; (3) certain steps may be performed in different orders; and (4) certain steps may be done concurrently.

A. General Overview

Aspects of the current patent document include systems and methods that provide per-user customization of network configuration commands based on one or more factors, such as a user's role, a user's historical habits, and a user's usage pattern. Such systems and methods address at least two issues. First, in embodiments, given limited or no command history for the user on the networking device, when the user starts entering a command, the system predicts and provides command auto-completion support. Second, in embodiments, given command-sequence history of the user on the networking device, when the user starts entering a command, the system predicts and auto-completes the command sequence.

In embodiments, a natural language processing (NLP) system includes one or more learning systems (e.g., supervised, semi-supervised, and/or unsupervised) that customized the NLP conversion of commands to more closely align with a user's particular usage. In embodiments, a per-user learning process includes presenting to the user a set of commands to allow the user to select which command is intended.

In embodiments, the system may assign a level of importance to each command and may require different levels of confirmation from the user based upon the criticality of the command. For example, minor commands (e.g., show version) may require no confirmation, whereas a command that would have drastic effects may require an affirmative confirmation (e.g., bring down port X). In embodiments, the level of criticality and confirmation required may be adjusted via user preference and/or machine learning. In embodiments, the system may be configured with a preference to being as minimally intrusive as possible regarding confirmation of commands.

In embodiments, a customization user profile may be used to help authenticate the user. And, in embodiments, if the authentication is uncertain, certain commands may not be allowed to the user without additional authentication.

FIG. 1 depicts a method for providing user-specific customization according to embodiments of the present disclosure. In embodiments, network configuration command entities and their relationship/dependency models are extracted (105) from natural language expressions available in technical design, best practices documents, recommendation documents, and the like. In embodiments, a repository of users and corresponding commands that each user entered based on the user's role (e.g., network administrator, network user, lab administrator, etc.) is created (110). In embodiments, the repository may not only include past history of commands used but may also include command usage pattern, and other usage-related data. In embodiments, the repository may then be used (115) to customize and present a most likely command or commands to the user during live usage.

Figure 2:
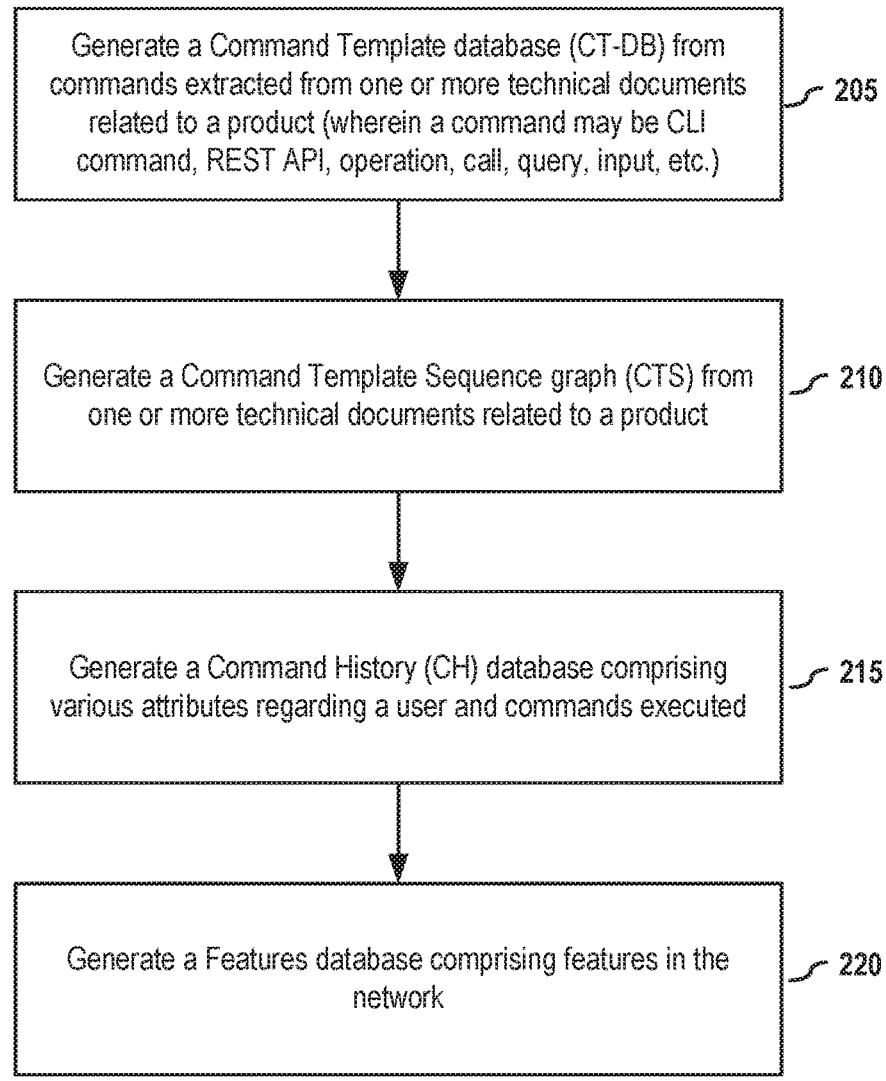
FIG. 2 depicts an example method for generating data for use in providing user-specific customization according to embodiments of the present disclosure.

FIG. 2 depicts a method for generating data for use in providing user-specific customization according to embodiments of the present disclosure. In embodiments, a command template database (CT-DB) is built (205) from commands extracted from one or more technical documents related to a product, which may be a device, service, or combination thereof. The term "command" shall be understood to cover a broad array of elements, such as a command-line-interface (CLI) command, an application programming interface (API), a Representational State Transfer (REST) API, an operation, a call, a query, an input, a request, a script, etc. Also, in embodiments, a command template sequence graph or tree (CTS) is built (210) by extracting order information from the one or more technical documents related to the product. In embodiments, a command history (CH) database comprising various attributes regarding a user and commands executed is also created (215). In embodiments, a features database is also created (220) to catalog all features that are currently active or available in a network device or in the network system.

Figure 3:
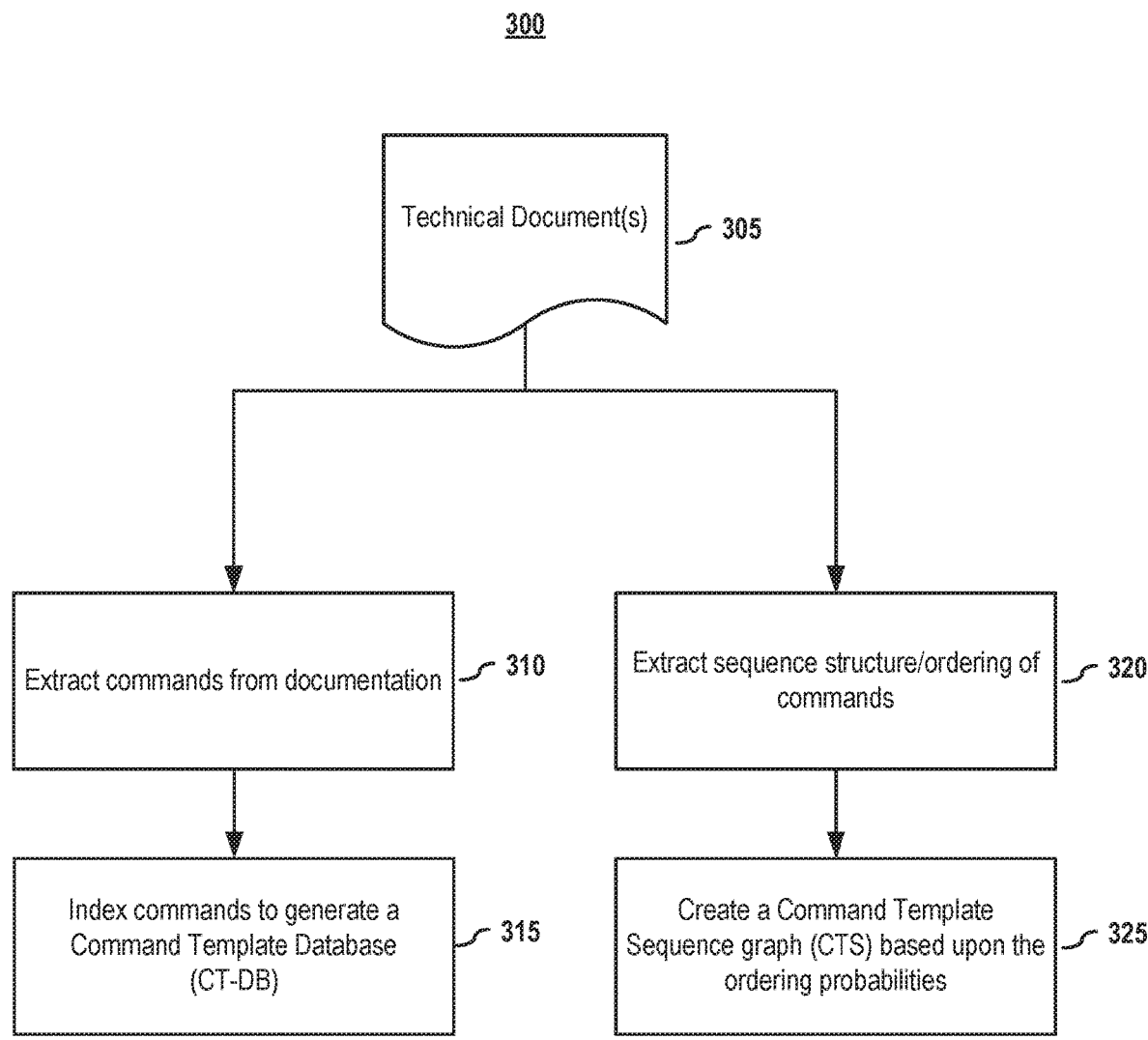
FIG. 3 depicts an example method for generating a command template database (CT-DB) and command template sequence graph (CTS) from documentation according to embodiments of the present disclosure.

FIG. 3 depicts a method for generating a command template database (CT-DB) and command template sequence graph (CTS) from documentation according to embodiments of the present disclosure. As shown in FIG. 3, one or more technical documents 305 are used to generate the CT-DB and CTS. As will be explained in more detailed below, in embodiments, the CT-DB is generated from the technical document(s) by extracting (310) commands and indexing (315) them. Also depicted in FIG. 3, the technical document(s) are used to extract (320) sequence structure or ordering of commands. The extracted sequencing may then be used to create (325) a command template sequence graph or tree.

B. Database Generation

1. Generating a Command Template Database (CT-DB)

Figure 4:
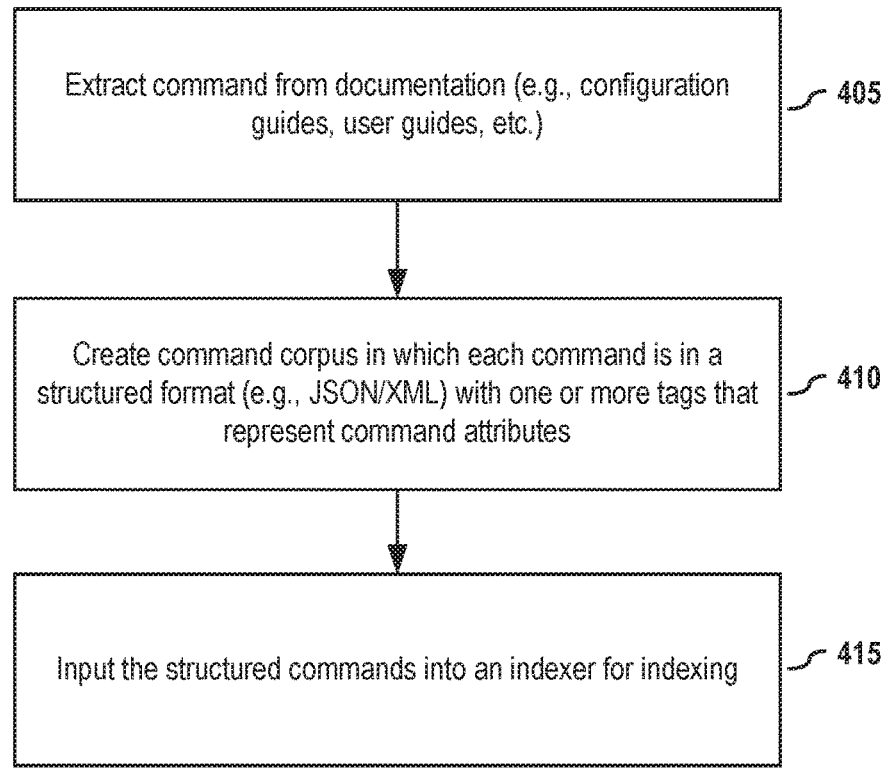
FIG. 4 depicts an example method for building a command template database according to embodiments of the present disclosure.

In embodiments, a command template database is consulted in a command generation system for suggesting a command for a particular product. In embodiments, a term frequency/inverse document frequency (TF/IDF)-based ranking function is used to get the most relevant match for an input. In embodiments, the APACHE LUCENE index engine may be used to index commands (e.g., CLIs and REST APIs) for template lookup. FIG. 4 depicts an example method for building a command template database according to embodiments of the present disclosure.

(i) Command Extraction

As shown in the embodiment depicted in FIG. 4, the process commences by extracting (410) commands from documentation 305. In embodiments, manual, semi-manual (using regular expressions, python, etc.), automatic methods, or combinations thereof may be used to extract commands from documentation, such as configuration guides and other source materials. For example, font type and/or size and known precursor statement (e.g., <word>#, | for options, [ ] or ( ) for options, etc.) of the command-syntax may be used to extract command features. In embodiments, copying and pasting command definition tables from portable document format (PDF) files into command definition files tended to be more accurate than statistical models, although statistical models may also be used to automate the extraction. One skilled in the art shall recognize that there are many ways in which to extract or "mine" content, such as tables and other multi-column structures, from PDF and other documentation files in a deterministic way, and such approaches may be utilized herein.

In embodiments, a document may comprise a command definition data set associated with the product. For example, a command definition data set, such as a YANG ("Yet Another Next Generation") data model, may be included with the source code of a product release, whether a new product release or an update release. A YANG model explicitly determines or defines the structure, semantics, and syntax of data, which can be configuration and state data. It should be noted that while references are made in this patent document to YANG models, other data models, schema, and the like (which may be referred to herein generally as a "structured data set," a "definition data set," or the like) may also be used. In embodiments, the structured data sets may be part of the documentation and used to extract information about commands.

(ii) Command Indexing

Returning to FIG. 4, in embodiments, a command corpus is created (410) in a structured format (e.g., JavaScript Object Notation (JSON)/Extensible Markup Language (XML)) and it is labelled with one or more tags. In embodiments, the tags may include such things as key-value pairs (e.g., [interface_type:vlan], [name:vlan_name], etc.). The extracted commands may then, in embodiments, be inputted (415) into an indexer, such as LUCENE, for indexing to create one or more indexes of the target-specific command templates. It shall be noted that this is trivial from the LUCENE API point of view, in which the path to the JSON/XML documents are passed to the LUCENE Index API. The output is a set of indexes. These indexes may be used as part of a lookup when the command auto-complete/suggestion system wants to match the most relevant command object to the query command input.

2. Generating a Command Template Sequence (CTS)

Figure 5:
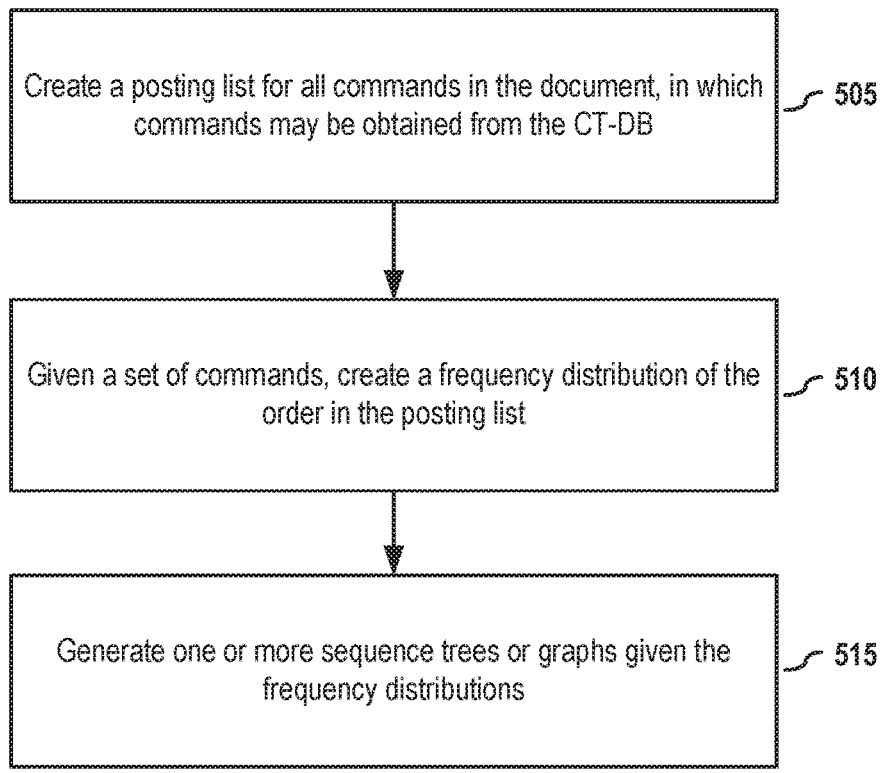
FIG. 5 depicts an example method for building a command template sequence (CTS) tree/graph database according to embodiments of the present disclosure.

FIG. 5 depicts an example method for building a command template sequence (CTS) tree/graph database according to embodiments of the present disclosure. As shown in FIG. 5, in embodiments, a posting list for commands in a document is created (505). In embodiments, a list of the commands to be identified in the document may be obtained from the CT-DB. Given a set of commands, a frequency distribution of the order may be obtained (510) from the posting list. In embodiments, a sequence tree or graph may then be generated (515) given the frequency distributions by selecting the highest frequency distributions. In embodiments, if different frequency distributions are within a threshold, then one or more alternate trees or graphs may also be generated. For example, frequency distributions that are within a threshold value may all be included in the CTS data. In embodiments, the threshold level may be automatically set, may be user-selected, or may be some combination thereof. In embodiments, a user may be presented with and select from options regarding possible sequences.

Consider, by way of illustration, the following example. Assume, for this example that the there is only one document in the documentation and that there are only three commands (C1, C2, and C3). The following are permutations of possible ordering:

C1, C2, C3
C1, C3, C2
C2, C1, C3
C2, C3, C1
C3, C1, C2
C3, C2, C1

The issue of extracting the order (or sequence) of commands may be solved by first creating a postings list (which is also known as an inverted list) of commands. The commands are extracted from the document and a postings list created:

| Dictionary: | Postings: |
|---|---|
| C1 | 2→4→5→7→19→ . . . |

| Dictionary: | Postings: |
|---|---|
| C2 | 1→2→3→5→23→ . . . |
| C3 | 1→3→4→5→ . . . | where the posting number refers to the command's position in the document.

Given a set of commands, the most probable order or orders may be identified by creating a frequency distribution of the order of their postings/occurrence in the document(s). In embodiments, the highest density probability from the ordered list may be taken as the most probable order. In this example, the most probable command sequence is C2, C3, C1.

It shall be noted that, in embodiments, Bayesian probability may be used to ascertain the order of sequence of commands. For example, for every subset of commands (e.g., x, y, z), the various sequence probability of may be calculated: $P(x|y)$, $P(x|z)$, $P(y|x)$, $P(z|x)$, etc. A matrix, m, may be generated of the probabilities relative to the various documents in the documentation:

|  | x | y | z |
|---|---|---|---|
| $Document_1$ | | | |
| $Document_2$ | | | |
| . . . | | | |
| $Document_n$ | | | |

In embodiments, a command sequence table of n-tuple commands may be created and the relational order of occurrence may be determined by selecting the n-tuple for the candidate command with the highest frequency.

Figure 6:
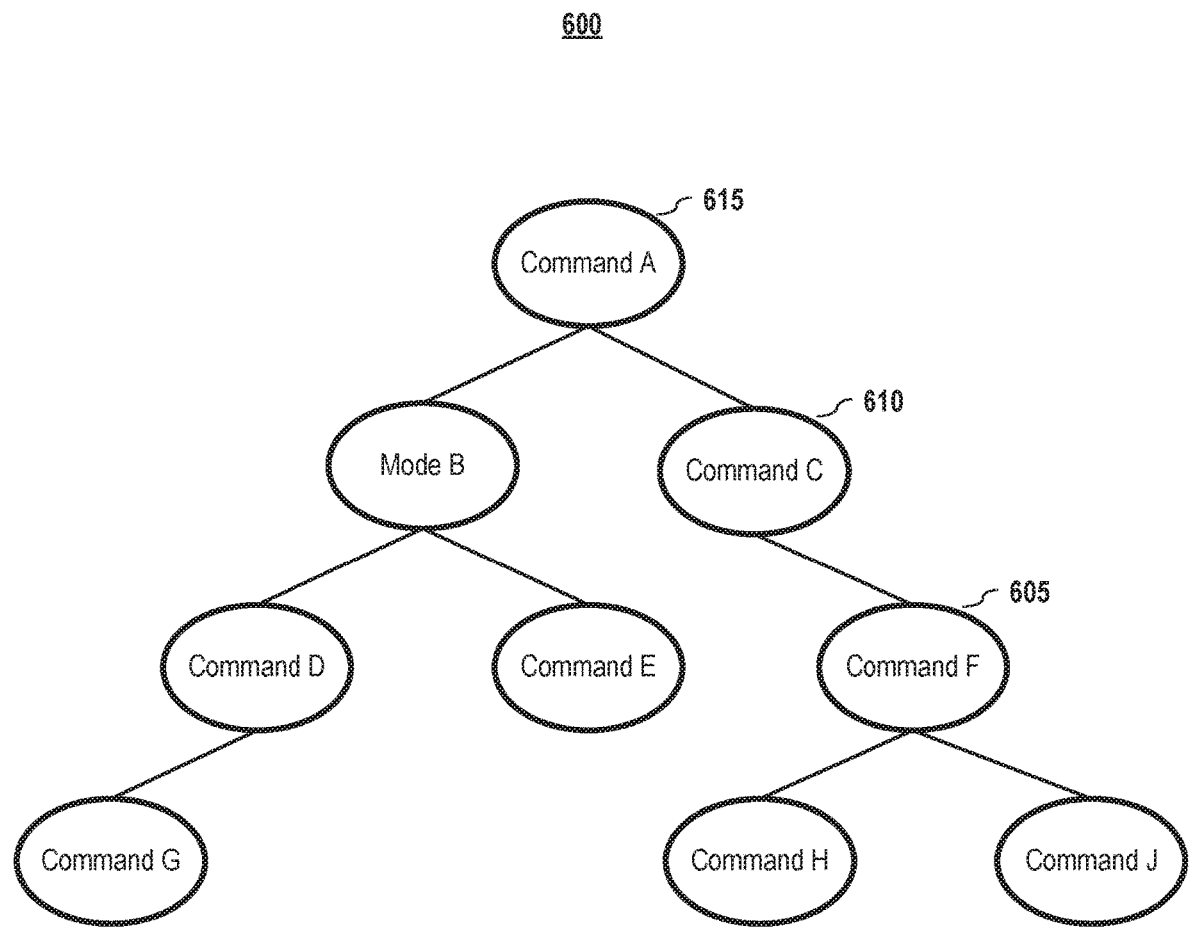
FIG. 6 graphically depicts an example command template sequence tree according to embodiments of the present disclosure.

FIG. 6 graphically depicts a command template sequence tree according to embodiments of the present disclosure. In embodiments, the sequence tree may be used to identify a command chain for a command. For example, if a command for Command F 605 is desired, the command tree 600 may be queried for that command. Once located, movement up the tree 600 identifies the command chain. In this example, the sequence would be Command A 615→Command C 610→Command F 605.

C. Generating a Command History Database

In embodiments, a command history database is a time-series database that stores various attributes regarding a user and the commands executed. In embodiments, this information may be considered as a table with multiple columns comprising such information as:

(1) time stamp of executed command;
(2) user identification;
(3) user role (e.g. network admin, system admin, server admin, lab admin, lab tech., etc.);
(4) mode in which commands were executed (e.g., EXEC mode or CONFIG mode); and
(5) commands executed.

One skilled in the art shall recognize fewer or more attributes may also be collected, such as the various parameters of the commands, network device, model, current version of software/firmware, etc.

Figure 7:
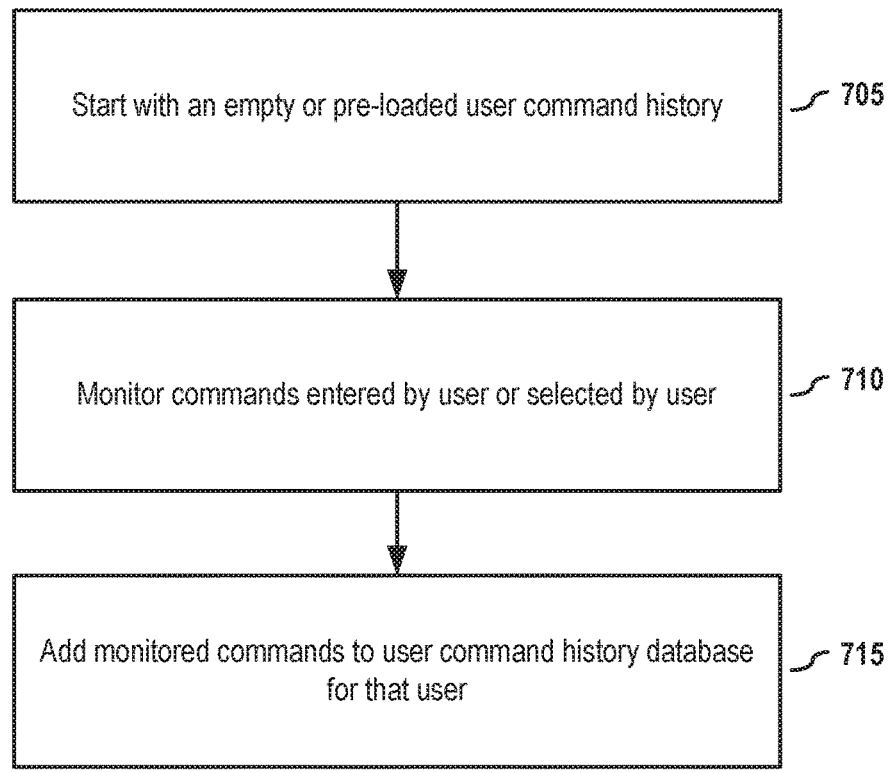
FIG. 7 depicts an example method for generating a user command history database according to embodiments of the present disclosure.

FIG. 7 depicts an example method for generating a user command history database according to embodiments of the present disclosure. It should be noted that, in embodiments, this database may be empty (705) at the beginning of a user's usage and may be added to by monitoring (710) and recording (715) the above-mentioned data as commands are entered/selected by the user. Alternatively, in embodiments, a common set of commands, which may be customized by the user, may be pre-loaded at the beginning of a user's usage. In embodiments, open-sourced software, such as NetConf, may be used to generate command history database. The NetConf engine has the capability of storing per user per session command history. Therefore, even if two or more users are logged into the system, the engine can properly store accurate command history from all the users.

D. Generating Configuration/Features Database

In embodiments, a configuration/features database stores the features currently active/running, available, or both for a specific product or for system (or subsystem). In embodiments, this database may be built by querying the running configuration of a product or system. In embodiments, the database may be organized according to product or sets of products (which may be classed as a system (or subsystem)).

E. System Embodiments

1. Natural Language Processing (NPL) System

Figure 8:
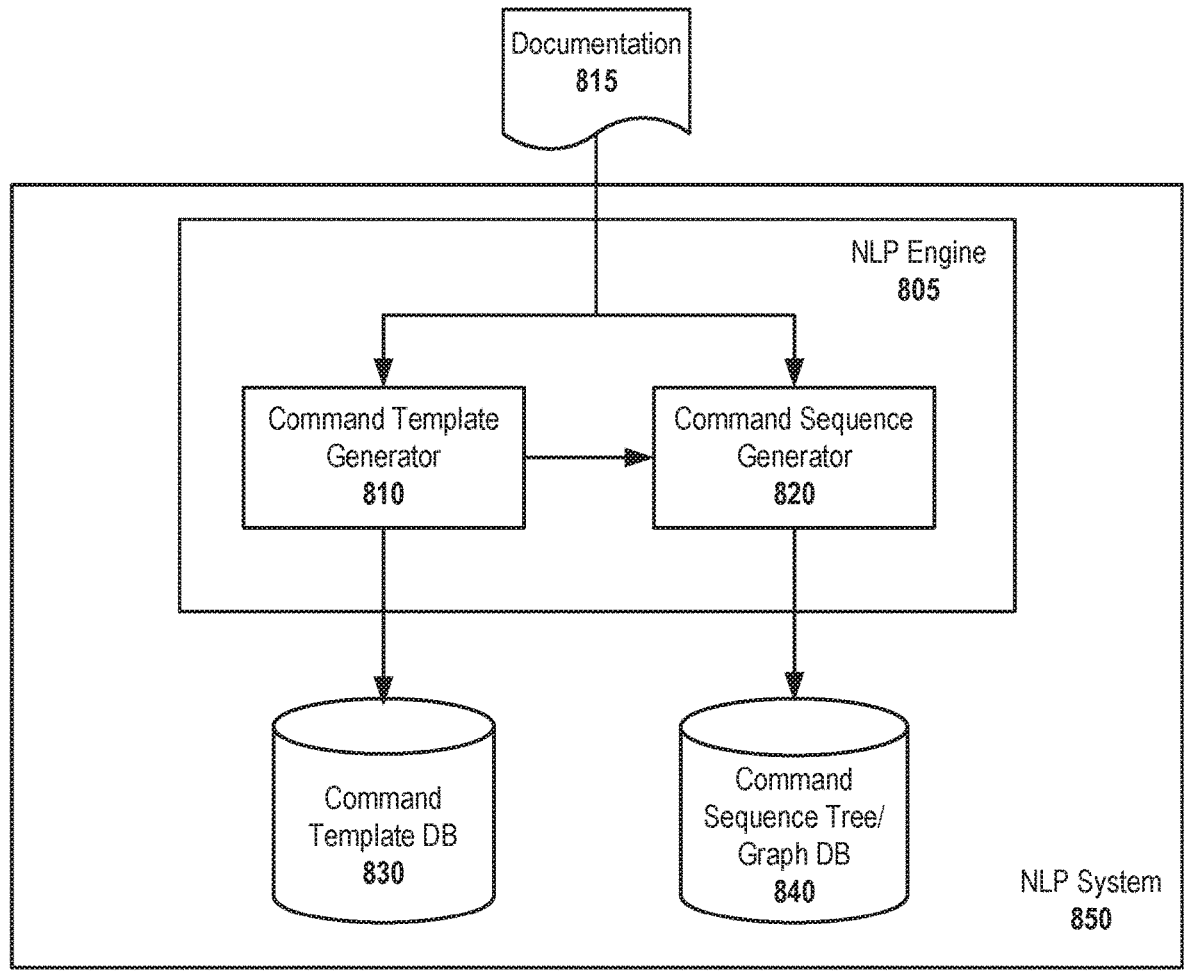
FIG. 8 depicts a natural language processing (NLP) system for generating datasets from documentation according to embodiments of the present disclosure.

FIG. 8 depicts a natural language processing (NLP) system for generating datasets from documentation according to embodiments of the present disclosure. In the depicted embodiments, the system 850 receives as input documentation 815 from which a command template database 830 and a command sequence tree/graph database 840 are created. In embodiments, the system 850 comprises a natural language processing (NLP) engine 805 and memory for storing the aforementioned databases.

In embodiments, the NLP engine 805 comprises two subsystems: a command template generator 810 and a command sequence generator 820.

In embodiments, the command template generator 810 receives as input the documentation 815 and generated the command templates. In embodiments, the command template generator 810 generates the command templates for the command template database 830 using one or more of the methods disclosed above with respect to FIG. 3 and FIG. 4.

In embodiments, the command sequence generator 820 receives as inputs the documentation and commands from the command template generator 810 (or alternatively, or additionally, from the command template database 830) and generates command template sequence graphs for the commands. In embodiments, the command sequence generator 820 generates the command sequence trees for the command sequence tree/graph database 840 using one or more of the methods disclosed above with respect to FIG. 3, FIG. 5, and FIG. 6.

2. User-Specific Command Entry NLP System

Figure 9:
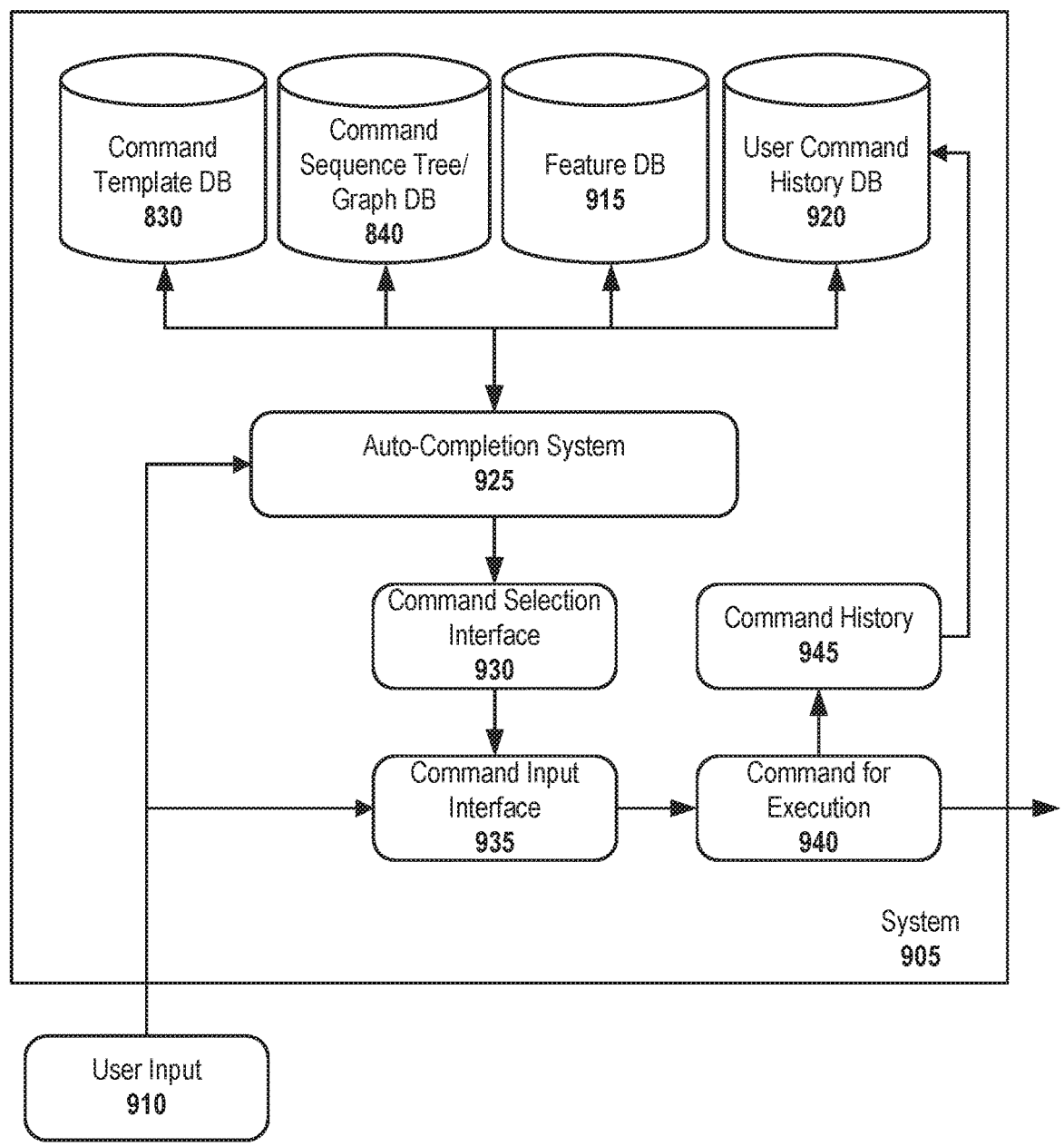
FIG. 9 depicts a natural language processing (NLP) system for providing user-specific command suggestions according to embodiments of the present disclosure.

FIG. 9 depicts a system 905 for facilitating user-specific customizable entry of a command or commands according to embodiments of the present disclosure. In the depicted embodiments, the system 905 begins by receiving a user input 910, which may comprise part of a command, and outputs a command or commands for execution 940.

In embodiments, the system 905 comprises a command template database 830 and a command sequence tree database 840, each of which may be obtained from a natural language processing (NLP) system, such as disclosed in FIG. 8. In embodiments, the system 905 also includes an embodiment of the NLP system 850 or may be communicatively coupled to such as system, or at least communicatively coupled to the output datasets 830 and 840.

In embodiments, the system 905 also comprises a configuration/features database 915. In embodiments, this database 915 stores the features currently active/running, available, or both for a specific product or for a system (or subsystem). In embodiments, this database 915 may be built by querying the running configuration of a product or system. In embodiments, the database may be organized according to product or sets of products (which may be classed as a system (or subsystem)).

In embodiments, the system 905 also comprises a user command history database 920, which stores, for each user, information regarding the user and commands requested/entered by the user. In embodiments, this information may comprise: (1) time stamp of executed command; (2) user identification; (3) user role (e.g. network admin, system admin, server admin, lab admin, lab tech., etc.); (4) mode in which commands were executed (e.g., EXEC mode or CONFIG mode); (5) commands requested; and (6) other related data. One skilled in the art shall recognize fewer or more attributes may also be collected, such as the various parameters of the commands, network device, model, current version of software/firmware, etc.

In embodiments, the initial database for a first-time user may be blank. Alternatively, in embodiments, a common set of commands, which may be customized by the user, may be pre-loaded at the beginning of a user's usage.

In embodiments, the system includes an auto-completion system 925, which receives the user input in real time (or near real time) and based on analysis, recommends auto-completion options to the user at a user interface, such as at a command line interface (CLI) prompt.

Figure 10:
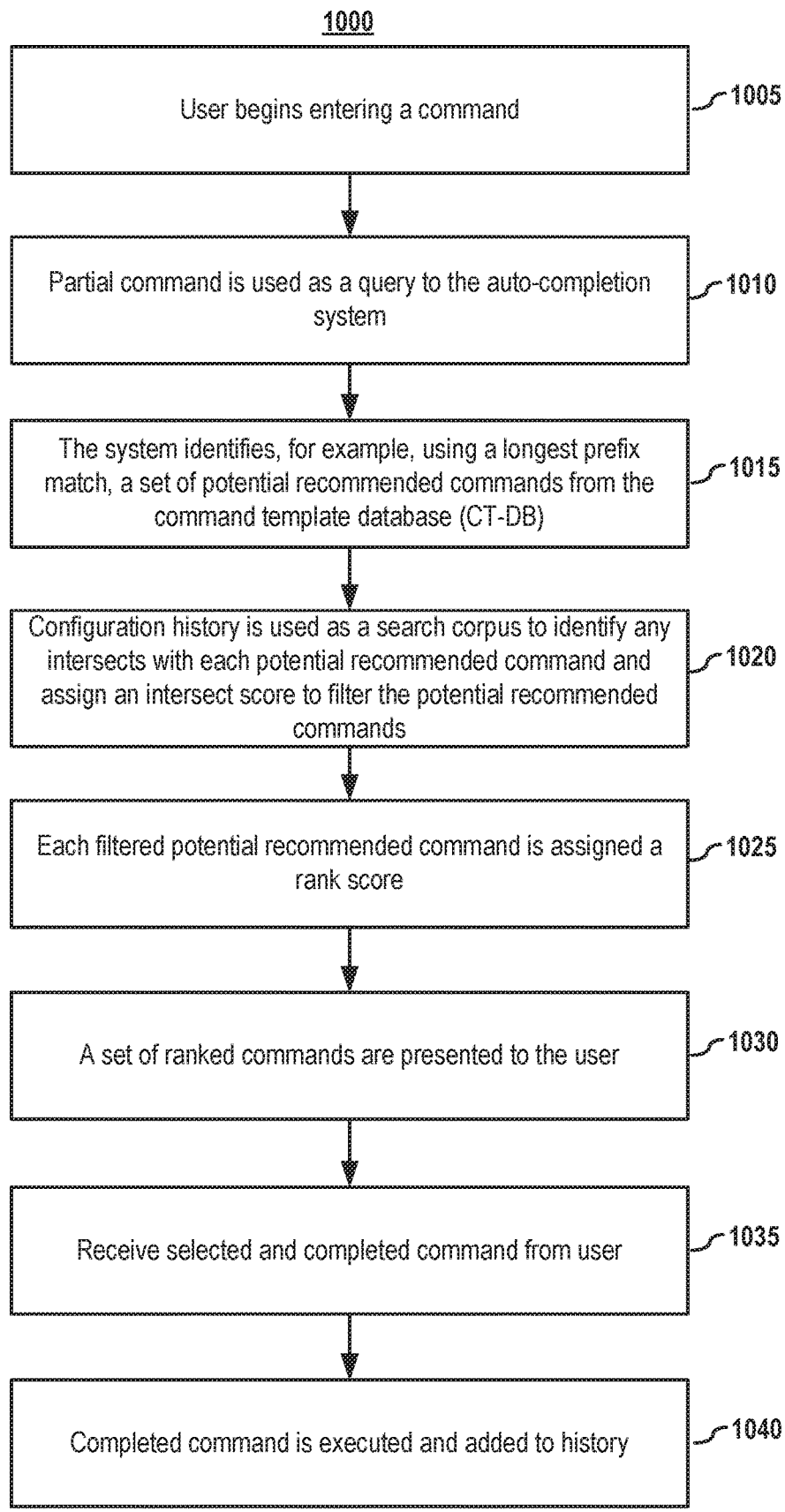
FIG. 10 depicts an example method for providing user-specific command suggestions according to embodiments of the present disclosure.

FIG. 10 depicts a methodology to auto-complete/auto-suggest a command, according to embodiments of the present disclosure. In embodiments, a user begins (1005) to enter a command, which is received by the system 905. For example, a user may want to get information using "show vlan," and the user starts to enters a partial command "show v". In embodiments, the partial command is provided to the auto-completion system 925, which uses (1010) the partial command as a query. In embodiments, the auto-completion system 925 searches the command template database 830 using, for example, a longest prefix match, to identify (1015) a set of potential recommendations (e.g., "show version," "show vlan," "show version image," "show virtual-service-domain," etc.).

In embodiments, the auto-complete system 925 may use identified potential recommendations to query the command sequence graph database 840 to obtain one or more command chains in order to expand the potential command recommendations. Consider, by way of illustration, the following example. In embodiments, a command sequence graph stores all relevant commands at a node. Given a system where features such as "VLAN," "VIRTUAL-DOMAIN," and "VLT" are enabled but "VRRP" is disabled, if a user in EXEC mode issues a command "show v," the CT-DB can be queried to return possible options: (1) VLAN; (2) VIRTUAL-DOMAIN; (3) VLT; and (4) VRRP. Note, however, that even though "VRRP" is disabled, in embodiments, it may still be in the list since the command sequence graph may not be designed with knowledge of the current running configuration. Therefore, in embodiments, this list may be further filtered to eliminate VRRP by examination or intersection with the features database, as explained in the next paragraph. Alternatively, in embodiments, the command sequence graph may be generated based upon configuration history and available features.

In embodiments, the auto-completion/suggestion system may also use configuration history/features, which is stored in the features database 915, as a search corpus and filter the set of potential recommended commands by performing (1020) an intersect assessment with each of the potential recommendations from the set of potential recommendations obtained in step 1015. In embodiments, this step identifies the potential recommended commands (from step 1015) that are most relevant to the command history. One skilled in the art shall recognize that term frequency (TF) may be used as a metric to assign an intersect score as a measure of intersection between a potential recommended command and the configuration/features of a product or system. For example, if the configuration history shows virtual-service-domain as having been created or existing within the network, then "show virtual-service-domain" may be assigned an intersect score of 1. Conversely, if no virtual local area networks (VLANs) were created, then "show vlan" would have an intersect score of 0. One skilled in the art shall recognize that other measures or metrics may alternatively or additionally be used and that different calculations may be used to assess an intersect score. In embodiments, potential recommended commands with an intersect score that is above a threshold may be kept as part of a filtered set (or stated differently, those commands with an interest score that is below a threshold are not included in the filtered set of recommended commands).

In embodiments, the filtered set of potential recommended commands are ranked (1025) using before being presented to the user. In embodiments, the ranking may include filtering the results to exclude commands that have rankings below a threshold or include results with rankings above a threshold.

In embodiments, ranking may be performed as follows. In embodiments, a rarity value is assessed. In embodiments, the rarity value of a potential recommended command may be an inverse document frequency (IDF) score of the potential recommended command, wherein if a command rarely appears in the CT-DB, the command is assumed to be elite/unique and has a higher ranking over other commands that appear more frequently in the CT-DB. Term frequency (TF) measures how frequently a term occurs in a document. Since every document is different in length, it is possible that a term may appear many more times in long documents than in shorter ones. Thus, the term frequency may be divided by the document length (i.e., the total number of terms in the document) as a way of normalization:

TF($t$)=(Number of times term $t$ appears in a document)/(Total number of terms in the document).

Inverse Document Frequency (IDF) is typically used as a measure of how important a term is. While computing TF, all terms are considered equally important. However, it is known that certain terms, such as "is," "of," and "the," may appear frequently but have little importance. Thus, to weigh down the frequent terms while scale up the rare ones, the following computation may be:

IDF($t$)=log$_e$(Total number of documents/Number of documents with term $t$ in it).

In embodiments, a predicted rank score may be determined. An example method for predicted rank score is as follows:

Predicted Rank Score=$W_0$*User Affinity+$W_1$*(TF·IDF)    (Eq. 1)

where:

$W_0$ and $W_1$ are chosen to maximize a Normalized Discounted Cumulative Gain (NDCG) value for the predicted ranking. NDCG measures performance of a recommendation system based on the graded relevance of the recommended entities, and may vary from 0.0 to 1.0, with 1.0 representing the ideal ranking of the entities. This metric is commonly used in information retrieval and to evaluate the performance of search engines. For example, Discounted Cumulative Gain (DCG) is a measure of ranking quality that uses a graded relevance scale of items in a search result list. It measures the usefulness of a document based on its position in the result list. If a recommender returns some items from a search, one would like to compute how good the list is. In embodiments, each item has a relevance score, which may be a non-negative number, which represents gain or usefulness. For items where there is no readily available relevance score (e.g., no user feedback about how relevant the item is relative to the search term(s)), the gain or usefulness value may be set to zero. These gain scores may then be summed to get a cumulative gain. In embodiments, because it is preferred to have the most relevant items at the top of the list, before summing the scores, each score may be divided by a growing number, such as a logarithm of the item's position. This division represents a discounting, which means that the resulting sum is a discounted cumulative gain. To make DCGs more directly comparable, they can be normalized. In embodiments, the worst possible DCG when using non-negative relevance scores is zero. To get the best, all the items in a test set are arranged in the ideal order of relevance, the first K items are taken, and the DCG value is computed. A raw DCG may then be divided by this ideal DCG value to get NDCG@K, which is a number between 0 and 1 and the K denote the length of the recommendations list. In embodiments, the length of the list may be user selected. In embodiments, values of K were chosen between 3-6.

One skilled in the art shall recognize that there are several methods to optimize NDCG, any of which may be used. Some common NDCG algorithms include: (1) convex optimization using Stochastic Gradient descent; (2) heuristic optimization methods, such as genetic algorithm for non-convex optimization; and (3) probabilistic framework.

TF·IDF represents a dot product of the intersect score (TF) and the inverse document frequency score discussed above.

User Affinity represents weighting of relevance with respect to the user and his or her prior command history. In embodiments, when the user has no command history in the user command history database 920, this value may be set to 0. If the user has some command history, the User Affinity score may be defined as TFu·IDFu, which is a dot product of the TFu and IDFu scores. In embodiments, the TFu score represents the term frequency of the command in the user command history database 920, and the IDFu score represents the inverse document frequency of the command in the user command history database 920.

The TF·IDF value is a factor that helps picks the items that are relevant for the query item. However if the query is small or partial, it might have a large relevance footprint. In other words, the user would have to add a few letters to increase the information in the query so that the TF·IDF factors helps gets a smaller set of items. Hence, in embodiments, for small queries, relevance may be weighted less and customization may be weighted more; to reduce relevance, the weight of the prior is reduced and the weight for User Affinity is increased.

In embodiments, each user command sequence may be considered to be a document. And, the collection of all user command sequences in the user command history database 920 may be considered to be the corpus for the calculation of the User Affinity Score.

One skilled in the art shall recognize that plurality of methodologies exists for ranking items, which methods form a part of the current patent document.

Returning to FIG. 10, having ranked the potential recommended commands, all or a set number of the ranked commands may be presented (1030) to the user. For example, in embodiments, the top 10 commands may be recommended to the user by presenting them to the user for selection. Or, alternatively, the commands with a rank value above a threshold may be presented to the user.

In embodiments, the user may examine the list of recommended commands and complete the command (1035). For example, in embodiments, the user may scroll through the recommended commands and select the desired command. If one or more parameters need to be added, the user may supply the missing parameter(s) to complete the command and may then submit it to the system for execution (1040). If no parameter(s) are needed, the user may simply accept the command and enter it.

If the user fails to find the desired command in the recommend list, the user may request additional ones or may enter (1040) the desired command, including any needed parameters.

In embodiments, regardless if the command is one selected from the recommended list or enter entirely by the user, the system 905 captures the entered command and adds (1040) it to the user command history database 920 for future reference.

Aspects of the present patent document are directed to information handling systems. For purposes of this disclosure, an information handling system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 11:
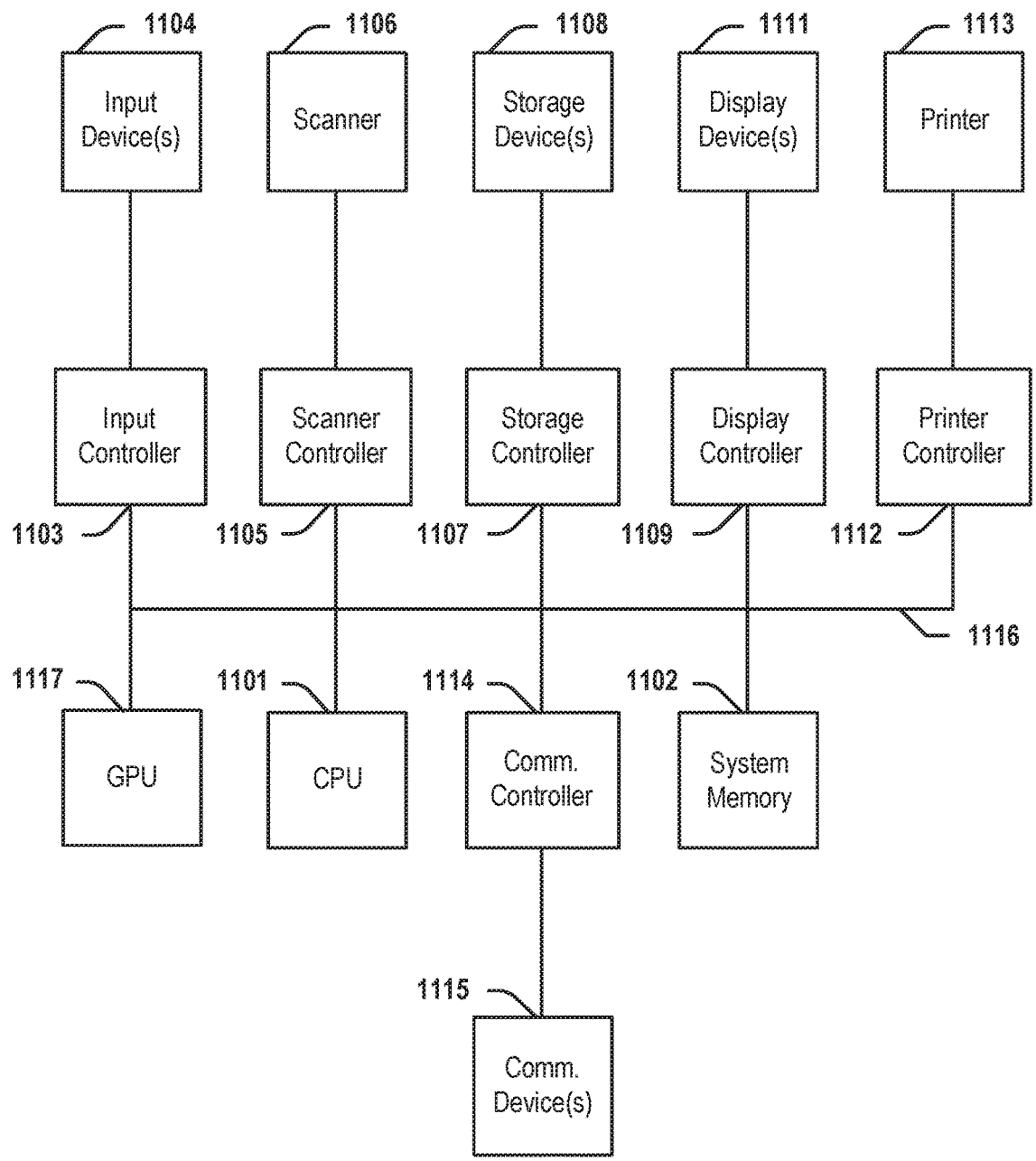
FIG. 11 depicts a simplified block diagram of an information handling system according to embodiments of the present invention.

FIG. 11 depicts a block diagram of an information handling system 1100 according to embodiments of the present invention. It will be understood that the functionalities shown for system 1100 may operate to support various embodiments of an information handling system—although it shall be understood that an information handling system may be differently configured and include different components. As illustrated in FIG. 11, system 1100 includes a central processing unit (CPU) 1101 that provides computing resources and controls the computer. CPU 1101 may be implemented with a microprocessor or the like, and may also include a graphics processor and/or a floating point coprocessor for mathematical computations. System 1100 may also include a system memory 1102, which may be in the form of random-access memory (RAM) and read-only memory (ROM).

A number of controllers and peripheral devices may also be provided, as shown in FIG. 11. An input controller 1103 represents an interface to various input device(s) 1104, such as a keyboard, mouse, or stylus. There may also be a scanner controller 1105, which communicates with a scanner 1106. System 1100 may also include a storage controller 1107 for interfacing with one or more storage devices 1108 each of which includes a storage medium such as magnetic tape or disk, or an optical medium that might be used to record programs of instructions for operating systems, utilities and applications which may include embodiments of programs that implement various aspects of the present invention. Storage device(s) 1108 may also be used to store processed data or data to be processed in accordance with the invention. System 1100 may also include a display controller 1109 for providing an interface to a display device 1111, which may be a cathode ray tube (CRT), a thin film transistor (TFT) display, or other type of display. The computing system 1100 may also include a printer controller 1112 for communicating with a printer 1113. A communications controller 1114 may interface with one or more communication devices 1115, which enables system 1100 to connect to remote devices through any of a variety of networks including the Internet, an Ethernet cloud, a Fibre Channel over Ethernet (FCoB)/Data Center Bridging (DCB) cloud, a local area network (LAN), a wide area network (WAN), a storage area network (SAN) or through any suitable electromagnetic carrier signals including infrared signals.

In the illustrated system, all major system components may connect to a bus 1116, which may represent more than one physical bus. However, various system components may or may not be in physical proximity to one another. For example, input data and/or output data may be remotely transmitted from one physical location to another. In addition, programs that implement various aspects of this invention may be accessed from a remote location (e.g., a server) over a network. Such data and/or programs may be conveyed through any of a variety of machine-readable medium including, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices.

Embodiments of the present invention may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present invention may further relate to computer products with a non-transitory, tangible computer-readable medium that have computer code thereon for performing various computer-implemented operations. The media and computer code may be those specially designed and constructed for the purposes of the present invention, or they may be of the kind known or available to those having skill in the relevant arts. Examples of tangible computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter. Embodiments of the present invention may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present invention. One skilled in the art will also recognize that a number of the elements described above may be physically and/or functionally separated into sub-modules or combined together.

It will be appreciated to those skilled in the art that the preceding examples and embodiment are exemplary and not limiting to the scope of the present invention. It is intended that all permutations, enhancements, equivalents, combinations, and improvements thereto that are apparent to those skilled in the art upon a reading of the specification and a study of the drawings are included within the true spirit and scope of the present invention.

What is claimed is:

1. A computer-implemented method for suggesting a command for a user for a functional product, the method comprising:

responsive to receiving at least part of a command input from the user, using the at least part of a command input as a query against a command template database comprising one or more commands obtained by extracting, using natural language processing, commands from technical documentation related to the functional product to obtain a set of potential recommended commands;

filtering the set of potential recommended commands to exclude recommended commands that have an intersect score relative to a features database for the functional product that are below a threshold to exclude at least some of the potential recommended commands that are not applicable given a current configuration of the functional product;

assigning a ranking value to each potential recommended command from the filtered set of potential recommended commands, the ranking value being based upon rarity of the potential recommended command in the command template database and a user-specific affinity score that gages relevance of the potential recommended command with respect to command history of the user; and presenting a set of recommend commands to the user based upon the ranking values.

2. The computer-implemented method of claim 1 wherein a command comprises one or more of a command line interface (CLI) command, an application program interface (API), operation, call, query, script, or input.

3. The computer-implemented method of claim 1 further comprising the steps of:

generating the command template database comprising one or more commands by extracting commands from the technical documentation about the functional product;

generating the features database that comprises available commands for the functional product; and generating a user command history database that stores the command history of the user.

4. The computer-implemented method of claim 3 wherein the step of generating the features database that comprises available commands for the functional product comprises:

querying running configuration of the function product to obtain the available commands for the functional product; and recording the available commands in the features database.

5. The computer-implemented method of claim 3 wherein the step generating the command template database comprising one or more commands by extracting commands from the technical documentation about the functional product using natural language processing comprises:

extracting the one or more commands from the technical documentation related to the functional product;

creating a command corpus of structured commands in which each command is in a structured format; and inputting the structured commands into an indexer for indexing.

6. The computer-implemented method of claim 3 further comprising:

responsive to receiving an entered command from the user, adding an entry into the user command history database that comprises the entered command.

7. The computer-implemented method of claim 6 wherein the entry further comprises at least one of:

a time stamp of when the entered command was entered;
an identification of the user;
a role of the user; and
a mode in which the entered commands was executed.

8. The computer-implemented method of claim 3 further comprising:

responsive to there being no command history for the user in the user command history database, weighting the user-specific affinity score a zero value.

9. The computer-implemented method of claim 3 further comprising:

responsive to there being no command history for the user in the user command history database, using a preset command history when gaging the user-specific affinity score.

10. An information handling system for suggesting a command for a user for a functional product comprising:

a command template database comprising one or more commands extracted, using natural language processing, from technical documentation about the functional product;

a features database that comprises available commands for the functional product;

a user command history database that stores command history of the user;

one or more processors;

a non-transitory computer-readable medium or media comprising one or more sequences of instructions which, when executed by at least one processor of the one or more processor, causes steps to be performed comprising:

responsive to receiving at least part of a command input from the user, using the at least part of a command input as a query against the command template database to obtain a set of potential recommended commands;

filtering the set of potential recommended commands to exclude recommended commands that have an intersect score relative to the features database for the functional product that are below a threshold to exclude at least some of the potential recommended commands that are not applicable given a current configuration of the functional product;

assigning a ranking value to each potential recommended command from the filtered set of potential recommended commands, the ranking value being based upon rarity of the potential recommended command in the command template database and a user-specific affinity score that gages relevance of the potential recommended command with respect to the command history of the user in the user command history database; and presenting a set of recommend commands to the user based upon the ranking values.

11. The information handling system of claim 10 wherein a command comprises one or more of a command line interface (CLI) command, an application program interface (API), operation, call, query, script, or input.

12. The information handling system of claim 10 wherein the features database is generated by performing the steps comprises:

querying running configuration of the function product to obtain the available commands for the functional product; and recording the available commands in the features database.

13. The information handling system of claim 10 wherein the non-transitory computer-readable medium or media further comprises one or more sequences of instructions which, when executed by at least one processor of the one or more processor, causes steps to be performed comprising:

responsive to receiving an entered command from the user, adding an entry into the user command history database that comprises the entered command.

14. The information handling system of claim 13 wherein the entry further comprises at least one of:

a time stamp of when the entered command was entered;
an identification of the user;
a role of the user; and
a mode in which the entered commands was executed.

15. The information handling system of claim 10 wherein the non-transitory computer-readable medium or media further comprises one or more sequences of instructions which, when executed by at least one processor of the one or more processor, causes steps to be performed comprising:
responsive to there being no command history for the user in the user command history database, weighting the user-specific affinity score a zero value.

16. The information handling system of claim 10 wherein the non-transitory computer-readable medium or media further comprises one or more sequences of instructions which, when executed by at least one processor of the one or more processor, causes steps to be performed comprising:
responsive to there being no command history for the user in the user command history database, using a preset command history when gaging the user-specific affinity score.

17. A non-transitory computer-readable medium or media comprising one or more sequences of instructions which, when executed by at least one processor, causes steps to be performed comprising:
responsive to receiving at least part of a command input from the user, using the at least part of a command input as a query against a command template database comprising one or more commands obtained by extracting, using natural language processing, commands from technical documentation related to the functional product to obtain a set of potential recommended commands;
filtering the set of potential recommended commands to exclude recommended commands that have an intersect score relative to a features database for the functional product that are below a threshold to exclude at least some of the potential recommended commands that are not applicable given a current configuration of the functional product;
assigning a ranking value to each potential recommended command from the filtered set of potential recommended commands, the ranking value being based upon rarity of the potential recommended command in the command template database and a user-specific affinity score that gages relevance of the potential recommended command with respect to command history of the user; and
presenting a set of recommend commands to the user based upon the ranking values.

18. The non-transitory computer-readable medium or media of claim 17 further comprises one or more sequences of instructions which, when executed by at least one processor causes steps to be performed comprising:
generating the command template database comprising one or more commands by extracting commands from the technical documentation about the functional product;
generating the features database that comprises available commands for the functional product; and
generating a user command history database that stores the command history of the user.

19. The non-transitory computer-readable medium or media of claim 17 further comprises one or more sequences of instructions which, when executed by at least one processor causes steps to be performed comprising:
responsive to receiving an entered command from the user, adding an entry into the user command history database that comprises the entered command.

20. The non-transitory computer-readable medium or media of claim 19 wherein the entry further comprises at least one of:
a time stamp of when the entered command was entered;
an identification of the user;
a role of the user; and
a mode in which the entered commands was executed.

* * * * *